United States Patent [19]
Rau et al.

[11] 3,925,583
[45] Dec. 9, 1975

[54] COMPOSITE QUARTZ GLASS BODY

[75] Inventors: Karlheinz Rau; Karl Seiler, both of Hanau am Main, Germany

[73] Assignee: Heraeus-Schott Quarzschmelze GmbH, Hanau am Main, Germany

[22] Filed: Feb. 6, 1973

[21] Appl. No.: 330,136

[30] Foreign Application Priority Data
Feb. 11, 1972 Germany............................ 2206493

[52] U.S. Cl. ................ 428/36; 138/141; 138/145; 427/193; 427/402; 428/428; 428/213
[51] Int. Cl.²................ C03B 19/06; C03C 17/02
[58] Field of Search..... 117/18, 23, 123 AB, 169 A, 117/125, 94, 97; 161/193, 164; 138/141, 145; 106/52; 65/60; 427/193, 402; 428/36

[56] References Cited
UNITED STATES PATENTS

| | | | |
|---|---|---|---|
| 2,188,121 | 1/1940 | Smith............................ | 117/123 A |
| 2,829,981 | 4/1958 | Shapiro....................... | 117/123 A X |
| 3,414,465 | 12/1968 | Tryggue et al................ | 117/125 X |
| 3,576,932 | 4/1971 | Biddulph...................... | 117/23 X |
| 3,645,695 | 2/1972 | Koepp et al. ................. | 117/95 X |
| 3,717,498 | 2/1973 | Franz et al....................... | 117/97 X |
| 3,772,134 | 11/1973 | Rau.................................. | 161/164 X |
| 3,776,809 | 12/1973 | Baumler et al. .................... | 161/164 |
| 3,779,856 | 12/1973 | Pirooz.............................. | 106/52 X |

FOREIGN PATENTS OR APPLICATIONS

| | | |
|---|---|---|
| 962,868 | 4/1957 | Germany |
| 1,293,554 | 4/1962 | France |

*Primary Examiner*—William D. Martin
*Assistant Examiner*—Shrive P. Beck
*Attorney, Agent, or Firm*—Burgess, Dinklage & Sprung

[57] ABSTRACT

A composite quartz glass body such as a hollow body, e.g., a diffusion tube or ampoule for carrying out diffusion processes for making solid state components includes an inner layer of synthetic quartz glass and an outer layer of quartz glass fused onto the inner layer from quartz crystal granules, the outer layer having a portion thereof which covers or envelops the inner layer and contains diffusion inhibitors of hydroxyl ions, divalent cations or small air bubbles.

13 Claims, 1 Drawing Figure

U.S. Patent   Dec. 9, 1975   3,925,583
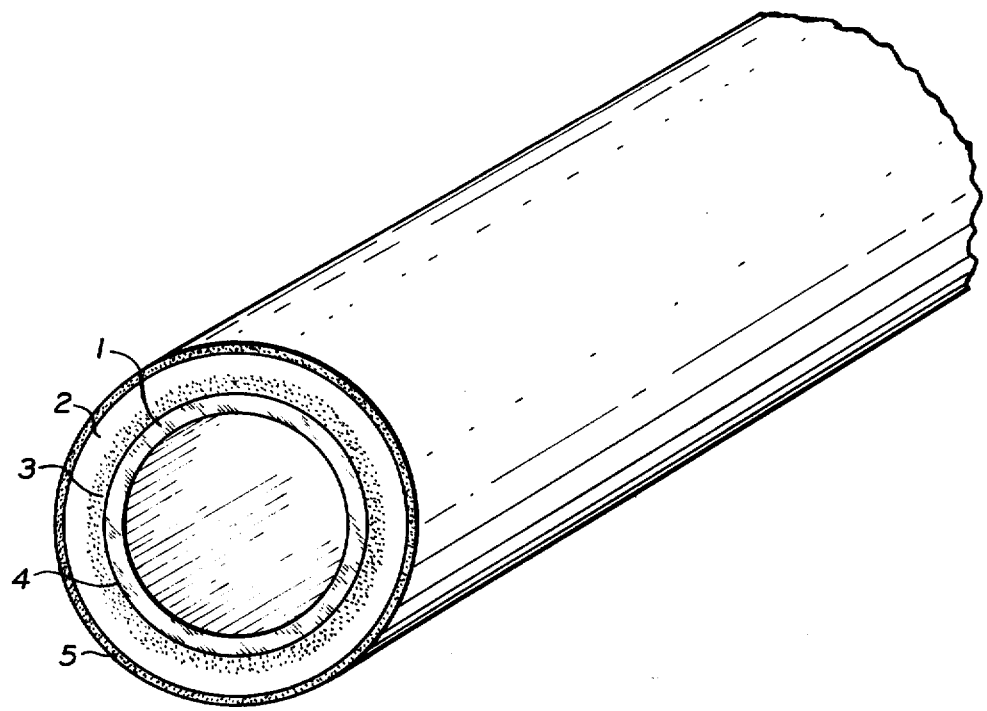

3,925,583

COMPOSITE QUARTZ GLASS BODY

BACKGROUND

This invention relates to a laminated quartz glass body, especially a hollow body of quartz glass useful in solid-state technology.

Diffusion processes are preferred for the doping of solid bodies, such as silicon or germanium wafers, with boron, gallium, indium, phosphorus, arsenic and antimony, and for oxidation. These diffusion processes are performed under very pure conditions at high temperatures, of more than 1000°C, for example. Consequently, quartz glass of high purity is used in many cases as the material for the diffusion devices, such as ampoules or diffusion tubes.

Recently, however, in the manufacture of field-effect transistors or of integrated circuits using field-effect transistors (such manufacture is performed under extremely high purity conditions), it has been found that a number of substances, including semiconductor poisons, diffuse through the quartz glass bodies used, such as diffusion tubes or ampoules, and interfere with the process of manufacturing the transistors. Trouble has been caused especially by sodium, which is especially feared on account of its relatively great diffusion coefficients in quartz glass.

French Pat. No. 1,293,554 discloses a quartz glass diffusion tube intended for semiconductor technology, which is provided with an external coating. This coating becomes fluid at high temperature, and is intended to prevent contaminants which interfere with the diffusion process used for doping semiconductors from diffusing through the wall of the quartz glass tube into the doping chamber. The maintenance of a molten coating on the outside of a quartz glass tube, however, is possible only with extreme difficulty, if at all.

In the oxidation of silicon wafers — often a necessary step in planar transistor technology — double-walled quartz glass tubes are used, in which the space between the walls is purged with a gas which continuously removes the sodium that diffuses through the outer quartz tube.

When a single-walled quartz glass tube is used, a gas is periodically introduced into the treatment chamber surrounded by the tube, which gas flushes out any sodium present on the inner wall of the tube, in the form of a compound having a high vapor pressure. These additional measures are very costly and in the case of the single-walled tube they necessitate a repeated interruption of the treatment process.

German Pat. No. 962,868 discloses a quartz glass crucible for the manufacture of semiconductor materials. It is composed of two quartz glass layer; one layer consists of pure quartz glass, the other of synthetic quartz glass; the latter faces the inside of the crucible. No special precautions are taken to prevent the diffusion of impurities through the crucible wall.

SUMMARY

The invention provides a laminated quartz glass body, especially a hollow body of quartz glass, for use in solid-state technology, in which the diffusion of contaminants through the walls of the body (especially sodium) is effectively prevented. A quartz body is provided having an inner layer of synthetic quartz glass and a quartz glass outer layer fused thereon from quartz crystal granules. In accordance with the invention, the fused-on quartz glass layer has a portion which covers or envelops the synthetic quartz glass layer and has diffusion inhibitors embedded therein.

DESCRIPTION OF THE DRAWING

The accompanying drawing is a perspective view of a preferred laminated quartz glass body of the invention.

DESCRIPTION

The layer portion may be located in any desired area within the fused-on quartz glass layer made from quartz crystal granules; the only requirement is that it envelop the synthetic quartz glass layer. Preferably, the layer portion is immediately adjacent to or contiguous with the layer of synthetic quartz glass. The thickness of the layer portion amounts to at least 10 percent and to at most 90 percent of the thickness of the fused-on quartz glass layer.

For inhibiting diffusion, it has been found practical to plug the lattice interstices of the layer portion with diffusion inhibitors. Particularly suitable for inhibiting diffusion is the incorporation of hydroxyl ions or divalent cations which are not semiconductor poisons into the lattice interstices of the fused-on quartz glass layer portion. Examples of diffusion inhibitors in the form of divalent cations are barium, calcium and beryllium.

As mentioned above, it is preferred that the layer portion in which the latice interstices are plugged to be directly adjacent or contiguous with the layer of synthetic quartz glass. This has the advantage that, in the event of a subsequent diffusion by the ions plugging the lattice interstices in the layer portion into the layer of synthetic quartz glass it envelops, the last possible lattice interstices are plugged in the inner layer of synthetic quartz glass also.

It has been found very advantageous to place trivalent ions at the lattice points in the layer portion in approximately twice the molar concentration of the divalent ions plugging the lattice interstices. The missing charge of the trivalent ions installed at the lattice points brings about an additional anchoring of the divalent ions, which bring about the equalization of the charge and are located at lattice interstices. Examples of trivalent ions which can be installed at lattice points and therefore have a relatively low movability so that they do not interfere with the semiconductor production process are gallium ions and/or aluminum ions.

The plugging of the interstices in the layer portion in accordance with the invention assures that the diffusion of undesired substances, especially sodium, through the walls of the quartz glass body surrounding the treatment chamber will be virtually completely suppressed, because the diffusion of most substances takes place through interstices. One need only be sure that the diffusion inhibitors plugging the interstices are not semiconductor poisons, that is, that they do not interfere with the process that is to be performed in the treatment chamber, such as the doping process, and that they diffuse more slowly in the synthetic quartz glass layer than the foreign substance, such as sodium, whose diffusion is to be inhibited.

Almost equally good results are achieved with regard to the inhibition of diffusion if, instead of plugging the interstices, tiny air bubbles separated by quartz glass are incorporated in the layer portion as diffusion inhibitors. In this case, however, the layer portion containing the air bubbles should not extend all the way to the outer surface of the fused-on quartz glass layer made from quartz crystal granules, because then the quartz glass body would be hard to clean.

The best results with regard to diffusion inhibition are obtained by the application of both measures, i.e., tiny air bubbles are incorporated in the quartz glass layer portion, and additionally the lattice interstices in this layer portion are plugged by the incorporation of hydroxyl ions and/or divalent ions.

If the guartz glass body of the invention is used for a long period of time at temperatures above 1000°C, it is recommended that it also be dimensionally stabilized. This may be accomplished as described in U.S. Pat. No. 3,772,134 issued Nov. 13, 1973 and U.S. Pat. No. 3,776,809 issued Dec. 4, 1973, for example by applying a coherent, finely crystalline layer composed of crystal modifications of quartz glass, especially a cristobalite layer, which can be made by sprinkling pure cristobalite powder onto the outer surface of the quartz glass layer 2 made from quartz crystal granules and firing the cristobalite powder thereon. A shape-stabilizing, coherent, finely crystalline layer, especially cristobalite layer, may also be produced while the quartz glass body is being used at high temperatures as disclosed in said copending applications. For this purpose, crystallization promoting nuclei in a quantity of less than $5 \cdot 10^{17}$ per cm$^2$ but more than $10^{13}$ per cm$^2$ are incorporated into the outer surface layer of the quartz glass layer 2 made from quartz crystal granules or into a quartz glass layer additionally applied to the quartz glass layer 2.

The drawing shows a perspective view of a quartz glass tube constructed in accordance with the invention.

The manufacture of a laminated quartz glass tube of the invention as shown in the drawing can be accomplished as follows. The starting product is the tube 1 consisting of synthetic quartz glass. Finely pulverized quartz crystal is sprinkled onto the tube 1 while it is continuously rotated, tangentially, and fused onto the synthetic quartz glass tube 1 by means of high-power burners. This forms the quartz glass layer 2. This layer 2 has a layer portion 3 which is advantageously directly adjacent to or contiguous with the outer surface 4 of the tube 1 of synthetic quartz glass.

The interstices in this layer portion are plugged by admixing the quartz crystal granules that are to be sprayed onto surface 4 to form layer 2 with additives which form divalent cations, that is to say, advantageously compounds of divalent cations that decompose at temperatures produced by the high-power burner. While the quartz glass layer 2 is being built up with the flame, hydroxyl ions are simultaneously incorporated.

In like manner, in order to incorporate trivalent ions on the lattice points, appropriate additives, such as compounds supplying gallium ions and/or aluminum ions are admixed with the quartz crystal granules.

Air bubbles may be produced in the layer portion 3 by sprinkling on the fine quartz crystal granules faster than is necessary for the production of a completely fused layer. It is thus possible, through the addition of compounds producing divalent ions to the quartz crystal granules to plug the lattice interstices and through the very rapid delivery of this mixture, not only to plug the interstices in layer portion 3, but also at the same time to produce tiny air bubbles therein. It has been established that, if only small air bubbles are produced in the layer portion 3, nothing that will plug the lattice interstices need by added to the quartz crystal granules. After the layer portion 3 has been formed, only pure quartz crystal granules are sprinkled on and melted, until the desired thickness is achieved in layer 2.

In order to achieve dimensional stability of the shape of the quartz glass tube thus produced, very pure cristobalite is sprinkled in powder form on the outer surface of the finish-drawn quartz glass tube, for example, and is burnt into the quartz glass surface by means of a flame or in a furnace, and the guartz glass tube is maintained at high temperature, if desired, until the fired-on cristobalite powder particles have formed a coherent, finely crystalline layer 5.

The following examples are intended to illustrate the present invention without limiting the same in any manner.

EXAMPLE 1

Fabrication procedure for a composite quartz glass tube with an inner layer of synthetic quartz glass and an outer layer of quartz glass fused onto said inner layer, said outer layer containing divalent cations as diffusion inhibitors.

Each end of a commercially available tube of synthetic guartz glass, having a wall thickness of 5 mm, a length of 1000 mm and a diameter of 45 mm, was clamped into a holder in such a manner that when both holders were rotated the tube rotates around its axis. The tube is then rotated around its axis with a speed of 40 rpm. A high-power burner, such as a plasma torch, was ignited and heating said tube. Finely pulverized quartz crystal in an amount of 10 g/min was tangentially sprinkled onto the tube of synthetic quartz glass while it was continuously rotated and by means of the burner fused onto said tube. At the beginning a compound having a divalent cation, such as dried pulverized calcium nitrate, was admixed to the finely pulverized quartz crystal in a concentration of 1 mol part Ca(NO$_3$)$_2$ to 2000 mol parts SiO$_2$. At the temperature where the quartz crystal is fused onto the tube of synthetic quartz glass by the high-power burner the admixed compound decomposes and forming divalent calcium cations. These divalent cations are plugging the lattice interstices of the quartz glass layer fused onto the tube of synthetic quartz glass.

After the quartz glass layer containing the divalent calcium cations has reached a thickness of 10 mm, the admixing of the compound delivering the divalent cations to the pulverized quartz crystal was stopped and thereafter only pulverized quartz crystal was sprinkled and fused onto the rotating tube until the fused onlayer has reached a thickness of 35 mm. Then the sprinkling of finely pulverized quartz crystal onto the rotating tube was stopped and the high-power burner shut off. The rotation of the tube was continued until it has cooled down to room temperature.

Thereafter a tube produced according to the aforesaid manner was drawn out on a bench to a tube having an outer diameter of 20 mm and a wall thickness of 1.5 mm.

From the introduction of CaO in a glass structure single bound oxygen ions and interruptions of the lattice will result, which means that by the introduction of Ca-ions the lattice is interrupted. As there are no free lattice places and the Ca-ions are introduced in the glass structure they must be on lattice interstices.

It is believed tha the same n ust happen, when the mixture of finely pulverized quartz crystal and calcium nitrate is sprinkled and fused on o the tube of synthetic quartz glass by the high-power burner as above described.

EXAMPLE 2

Fabrication procedure for a composite quartz glass tube with an inner layer of synthetic quartz glass and an outer layer of quartz glass fused onto said inner layer, said outer layer containing trivalent cations as diffusion inhibitors.

As described in Example 1 finely pulverized quartz crystal in an amount of 10 g/min is tangentially sprinkled and fused onto a tube of commercially available synthetic quartz glass having a wall thickness of 5 mm, a length of 1000 mm and a diameter of 45 mm, which tube was continuously rotated at a speed of 40 rpm. Instead of a compound having a divalent cation a compound having a trivalent cation, such as dried aluminum nitrate was at the beginning admixed to the finely pulverized quartz crystal in a concentration of 1 mol part $Al(NO_3)_3$ to 1800 mol parts $SiO_2$. The other manufacturing steps are the same as in Example 1.

From glass technology it is known that in small concentrations the trivalent Al-ion behaves like a "converter" of a $SiO_2$ lattice, which means, it does not built a glass lattice in the classical sense rather it is introduced on lattice interstices. This may be demonstrated by measuring of the K $\alpha$-line of Al by rontgen fluorescence.

EXAMPLE 3

Procedure for the fabrication of a composite quartz glass tube with an inner layer of synthetic quartz glass and an outer layer of quartz glass fused onto said inner layer, said outer layer containing small air bubbles as diffusion inhibitors separated from one another by quartz glass.

A commercially available tube of synthetic quartz glass having a wall thickness of 5 mm, a length of 1000 mm and a diameter of 45 mm was rotated around its axis with a speed of 40 rpm. A high-power burner was heating said tube. Finely pulverized quartz crystal was tangentially sprinkled onto the tube of synthetic quartz glass while it was continuously rotated and by means of the high-power burner fused onto said tube to form a quartz glass layer. In order to produce air bubbles in said quartz glass layer the finely pulverized quartz crystal is sprinkled on the rotating tube in an amount of 50 g/min, which is five times more than the amount for producing a bubble-free quartz glass layer.

After an air bubbles containing layer having a thickness of 15 mm was built up the feed-rate of the finely pulverized quartz glass was reduced to 10 g/min in order to produce then an air bubble-free quartz glass layer. When the bubble-free layer has reached a thickness of 30 mm, then no further quartz crystal was sprinkled onto the tube and fused thereon. The rotation of the tube was continued until it has cooled down to room temperature. The tube produced according this procedure was also drawn out on a bench like the tube in Example 1.

EXAMPLE 4

For producing a composite quartz glass tube with an outer layer of quartz glass wherein the lattice interstices are plugged with hydroxyl ions, a commercially available tube of synthetic quartz glass, as described in Example 1, was rotated around its axis with a speed of 40 rpm. Onto said tube was tangentially sprinkled finely pulverized quartz crystal in an amount of 10 g/min and fused onto said rotating tube by using a high-power burner. Instead of a plasma torch was used as power burner a burner fed with a mixture of oxygen and hydrogen. Hydroxyl ions were formed during the burning of said mixture and incorporated into the quartz layer of fused pulverized quartz crystal. When the layer containing hydroxyl ions has reached a thickness of 40 mm, then the sprinkling of finely pulverized quartz crystal was stopped and the oxygen-hydrogen burner shut off. Thereafter a plasma torch was ignited and again pulverized quartz crystal sprinkled onto the rotating tube in an amount of 10 g/min and fused onto it until a thickness of 5 mm was reached. Then the plasma torch was shut off and the feeding of quartz crystal stopped. The tube was rotated until it has reached room temperature.

As in Example 1 this tube was drawn out on a bench too.

The OH-ion has only one free valence. It is introduced into a glass lattice of the form —Si—O—Si—, in such a way that the —O— is replaced by two OH-ions forming the lattice structure —Si—OH + OH—Si—. From this results that OH-ions are always introduced on lattice interstices.

What is claimed is:

1. Composite quartz glass body comprising an inner layer of synthetic quartz glass and an outer layer of quartz glass fused onto said inner layer by melting of quartz crystal granules, said outer layer having a portion thereof which covers said inner layer and containing at least one inhibitor selected from the group of hydroxyl ions and divalent cations, said inhibitor retarding the diffusion of substances through said quartz glass body which interfere with the process of manufacturing solid state components, said portion of said outer layer being at least 10 percent to at most 90 percent of the thickness of said fused-on outer layer, said portion of the outer layer being contiguous with the inner layer, the remaining portion of said outer layer being free of said inhibitor and being more distant from said inner layer than the portion containing said inhibitor.

2. Quartz glass body of claim 1 wherein said divalent cations are selected from the group of barium, calcium and beryllium.

3. Quartz glass body of claim 1 wherein the inhibitor is divalent cations and trivalent ions are placed at lattice points in said portion of said outer layer in a molar concentration about twice as great as the molar concentration of the divalent cations.

4. Quartz glass body of claim 3 wherein said trivalent ions are selected from the group gallium and aluminum ions.

5. Quartz glass body of claim 1 wherein a shape-stabilizing, coherent, finely crystalline layer of crystal modifications of quartz is applied to said outer layer.

6. Quartz glass body of claim 5 wherein for the formation of coherent, finely crystalline layer of crystal modifications of quartz, a quartz glass layer containing less than $5 \cdot 10^{17}$ but more than $10^{13}$ crystallization promoting nuclei per square centimeter is applied to said outer layer.

7. Quartz glass body of claim 5 wherein the crystal modification of quartz is cristobalite.

8. Composite quartz glass body comprising an inner layer of synthetic quartz glass and an outer layer of quartz glass fused onto said inner layer by melting of quartz crystal granules, said outer layer having a portion thereof which covers said inner layer and containing small air bubbles as an inhibitor which retards the diffusion of substances through said quartz glass body which interfere with the process of manufacturing solid state components, said portion of said outer layer being at least 10 percent to at most 90 percent of the thickness of said fused-on outer layer, said portion of the outer layer being contiguous with the inner layer, the remaining portion of said outer layer being free of said inhibitor and being more distant from said inner layer than the portion containing said inhibitor.

9. Quartz glass body of claim 8 wherein a shape-stabilizing, coherent, finely crystalline layer of crystal modification of quartz is applied to said outer layer.

10. Quartz glass body of claim 9 wherein for the formation of a coherent, finely crystalline layer of crystal modifications of quartz, a quartz glass layer containing less than $4 \cdot 10^{17}$ but more than $10^{13}$ crystallization promoting nuclei per square centimeter is applied to said outer layer.

11. Quartz glass body of claim 9 wherein the crystal modification of quartz is cristobalite.

12. Composite quartz glass body comprising:
i. an inner layer of synthetic quartz glass;
ii. an outer layer of quartz glass fused onto said inner layer by melting of quartz crystal granules, said outer layer having a portion thereof which covers said inner layer and containing at least one inhibitor from the group of hydroxyl ions and divalent cations, said inhibitor retarding the diffusion of substances through said quartz glass body which interfere with the process of manufacturing solid state components, said portion of said outer layer being at least 10 percent to at most 90 percent of the thickness of said fused-on outer layer, said portion of the outer layer being contiguous with the inner layer, the remaining portion of said outer layer being free of said inhibitor and being more distant from said inner layer than the portion containing said inhibitor; and
iii. a shape-stabilizing, coherent, finely crystalline layer of crystal modifications of quartz applied to said outer layer.

13. Composite quartz glass body comprising:
i. an inner layer of synthetic quartz glass;
ii. an outer layer of quartz glass fused onto said inner layer by melting of quartz crystal granules, said outer layer having a portion thereof which covers said inner layer and containing small air bubbles as an inhibitor which retards the diffusion of substances through said quartz glass body which interfere with the process of manufacturing solid state components, said portion of said outer layer being at least 10 percent to at most 90 percent of the thickness of said fused-on outer layer, said portion of the outer layer being contiguous with the inner layer, the remaining portion of said outer layer being free of said inhibitor and being more distant from said inner layer than the portion containing said inhibitor; and
iii. a shape-stabilizing, coherent, finely crystalline layer of crystal modifications of quartz applied to said outer layer.

* * * * *